United States Patent
Blodgett, Jr.

(10) Patent No.: US 6,938,939 B2
(45) Date of Patent: Sep. 6, 2005

(54) ROOM EXPANSION SYSTEM

(75) Inventor: Raymond Willis Blodgett, Jr., Norco, CA (US)

(73) Assignee: RBW Industries, Inc., Chino, CA (US)

( * ) Notice: Subject to any disclaimer, the term of this patent is extended or adjusted under 35 U.S.C. 154(b) by 0 days.

(21) Appl. No.: 10/607,288

(22) Filed: Jun. 25, 2003

(65) Prior Publication Data

US 2004/0007890 A1 Jan. 15, 2004

Related U.S. Application Data

(60) Provisional application No. 60/391,821, filed on Jun. 26, 2002.

(51) Int. Cl.$^7$ ............................................. B62D 33/08
(52) U.S. Cl. .................. 296/26.01; 296/175; 296/26.13
(58) Field of Search ................................ 296/165, 171, 296/175, 26.01, 26.12, 26.03, 26.09, 26.13; 52/67

(56) References Cited

U.S. PATENT DOCUMENTS

| | | | |
|---|---|---|---|
| 5,634,683 A | 6/1997 | Young | |
| 5,758,918 A | 6/1998 | Schneider et al. | |
| 5,791,715 A | 8/1998 | Nebel | |
| 5,833,296 A | 11/1998 | Schneider | |
| 6,109,683 A | 8/2000 | Schneider | |
| 6,152,520 A | 11/2000 | Gardner | |
| 6,266,931 B1 * | 7/2001 | Erickson et al. | 52/67 |
| 6,623,066 B2 * | 9/2003 | Garceau et al. | 296/165 |
| 6,655,723 B2 * | 12/2003 | Meijer et al. | 296/26.01 |
| 6,685,249 B2 * | 2/2004 | Schneider | 296/26.01 |
| 2003/0205911 A1 | 11/2003 | Schneider | |

FOREIGN PATENT DOCUMENTS

WO  WO 01/53132 A1  7/2001

* cited by examiner

Primary Examiner—Stephen Gordon
(74) Attorney, Agent, or Firm—Inskeep IP Group, Inc.

(57) ABSTRACT

The slide-out mechanisms described herein are generally composed of two components. More specifically, the slide-out mechanism includes at least one elongated member, also referred to as a ram, which is coupled to the floor of a movable room. This elongated member moves with the extendable portion of a movable room. Additionally, the slide-out mechanism includes a base that is coupled to the coach floor and contains a motive device for extending and retracting the movable room accessible from the inside of the slide-out room. According to various embodiments disclosed herein, the motive device may be a hydraulic, pneumatic, or electrical motor. Alternatively, the motive force may be a crank that may be manually actuated to extend and retract the slideout room.

22 Claims, 3 Drawing Sheets

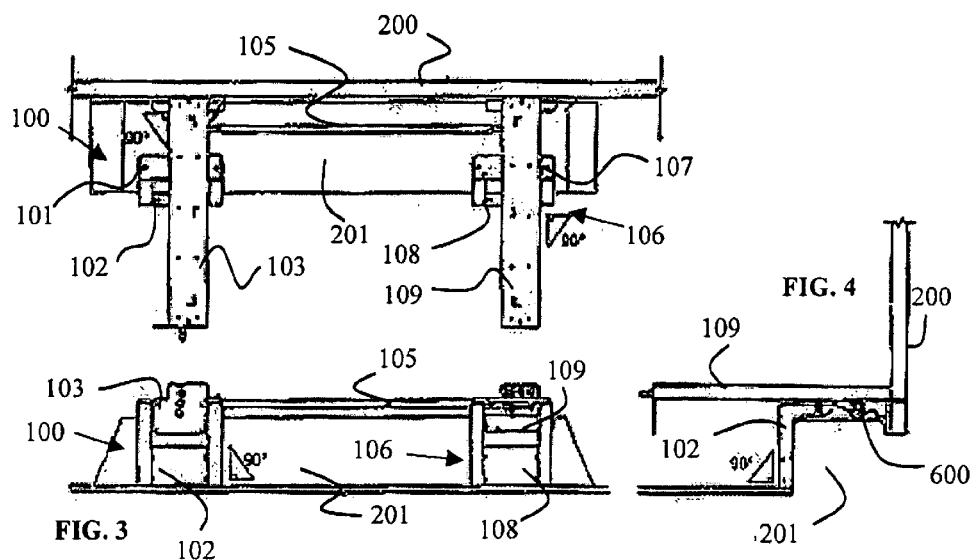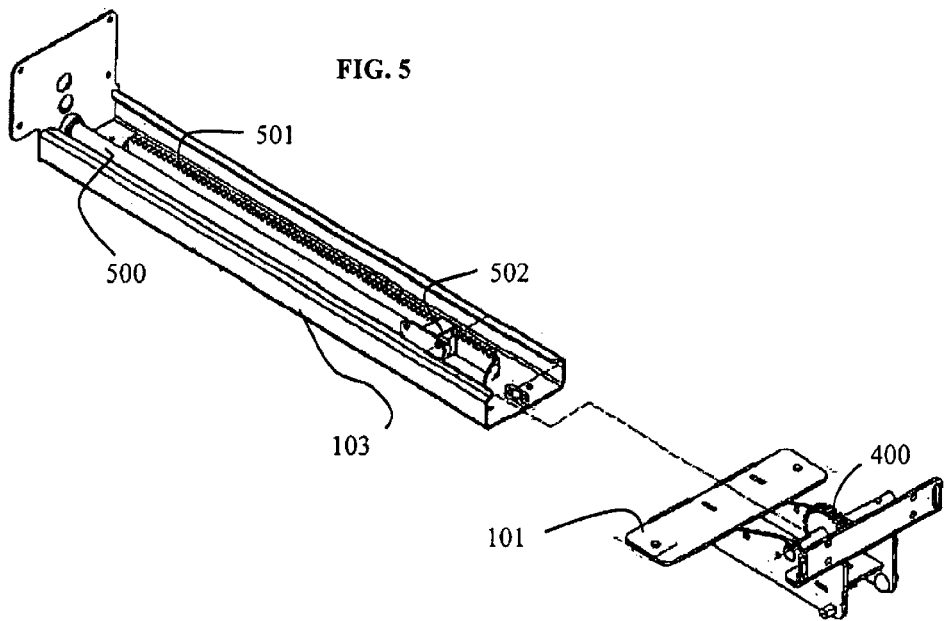

ROOM EXPANSION SYSTEM

CROSS REFERENCE TO RELATED APPLICATIONS

This application claims priority to U.S. Provisional Patent Application No. 60/391,821 filed on Jun. 26, 2002, which is hereby incorporated by reference.

BACKGROUND

In order to increase the available interior space of a motorized or towable vehicle such as a motor home or trailer, slide-out rooms can be made integral with the vehicle. When the vehicle is in transit, the slide-out room can be retracted and stored in the vehicle's interior with the exterior wall of the slide-out room approximately flush with the vehicle's exterior. As such, there is typically adequate space within the vehicle's interior to accommodate users in transit and remain within the standard width limitations imposed upon a vehicle. When the vehicle is parked and leveled, the slide-out room is then slid outward through an opening formed in a sidewall of a fixed room, increasing the internal accommodations.

A typical slide-out room usually includes a floor section, a roof section, a first sidewall section, a second sidewall section, and a third sidewall section. In the retracted position, the roof section and the first and second sidewall section are concealed from exterior view, and the third sidewall section forms a portion of the vehicle's sidewall. At the same time, the floor section of the slide-out room typically rests above a floor section of a fixed room and may form a portion of the usable interior floor during vehicle transit. Similarly, the roof section of the slide-out room may define the interior ceiling of that part of the vehicle during transit. The proximal ends of the roof section, first sidewall section, and second sidewall section, include stop walls. As used herein, "proximal" refers to the portion towards the vehicle body and "distal" refers to the portion away from the vehicle body. The stop walls form a L-shaped configuration with the respective roof section, first sidewall section and second sidewall section. The stop walls engage the inner surface of a respective sidewall section of the fixed room when the slide-out room is fully extended, and thereby limit the travel of the slide-out room. Weather sealing material, as in compressible strip form, is located on the abutting surfaces of the stop walls and/or inner surface of the respective sidewall of the fixed room.

A number of slide-out extension mechanisms are currently used to extend and retract the slide-out room. Typically, a slide-out extension mechanism includes a pair of support rails which telescopically extend and retract from a pair of channels. The support rails are attached to the slide-out room and the channels are attached to the fixed portion of the vehicle, such as the fixed room, wherein the slide-out room retracts and extends with the retraction and extension of the support rails. The support rails may be driven hydraulically, pneumatically, electrically or various combinations thereof. In the fully extended position, the support rails extend outwardly in a cantilevered manner and support the slide-out room. The slide-out room is further supported by the stop walls abutting the inner surface of the respective sidewall section of the fixed room.

Previous slide-out mechanisms utilize manual hand-crank devices located outside the slide-out room. While functional, a user is forced to stand outside the slide-out room to operate the manual crank. This leaves the user exposed to possibly extreme weather conditions such as heat, cold, rain, snow, sleet, hail, and wind.

Previous motorized slide-out mechanisms place the motor on the outside of the slide-out room. This positioning can leave the motor exposed to the elements, decreasing its lifespan. Other designs provide an outer compartment for the motor, embedded into the room. While this compartment design protects the motor from the weather, the compartment reduces the interior space of the slide-out room.

Although these prior art slide-out extension mechanisms are useful, there remains a need for an improved slide-out mechanism that allows a user to extend a slide-out room from the interior of the room. There also remains a need for an improved slide-out mechanism that allows a user to easily attach a motor without requiring a significant amount of interior space.

BRIEF SUMMARY

The slide-out mechanisms described herein are generally composed of two components. More specifically, the slide-out mechanism includes at least one elongated member, also referred to as a ram, which is coupled to the floor of a movable room. This elongated member moves with the extendable portion of a movable room. Additionally, the slide-out mechanism includes a base that is coupled to the coach floor and contains a motive device located in the interior of the room for extending and retracting the movable room. According to various embodiments disclosed herein, the motive device may be a hydraulic, pneumatic, or electrical motor. Alternatively, the motive force may be a crank that may be manually actuated to extend and retract the slideout room.

In one aspect of the invention, the slide-out mechanism is composed of an elongated, rectangular ram having two opposing sides extending downward, terminating in an inwardly angled lip. A geared rack extends the length of the ram, located between the opposing sides. The ram slides lengthwise over a base member which is attached to the floor or wheel well of a vehicle. The base member contains a mounted vertical gear that couples with the gear rack of the ram. The base member is mounted at a 90 degree angle to the expanding direction of the extending room area, allowing the ram to slide lengthwise over the base member in the direction the room area is intended to expand. A motive device such as a motor or crank is mounted to the ram and further connected to the ram via an acme screw, providing the force to extend the room. The crank can be located in a cabinet or hidden behind a facade for aesthetic purposes. The optional motor can be mounted to the bottom of the ram or another easily accessible position. Both motor and crank can be coupled to the mechanism at the same time, giving the user a backup extension method in case of motor failure.

In another exemplary embodiment, two ram/base member sliders can be used. A leader ram possesses the motive device while a parallel follower ram lacks a motive device and instead is connected to the leader ram through a cross shaft. The cross shaft is coupled to the gear assembly of each of the base members. As the gear assembly of the leader base member rotates, the cross shaft also rotates. This causes the gear assembly of the follower base member to rotate, engaging the gear rack of the follower ram, moving the follower ram in unison with the leader ram.

BRIEF DESCRIPTION OF THE DRAWINGS

These and other details of the invention will be described in connection with the accompanying drawings, which are furnished only by way of illustration and not in limitation of the invention, and in which drawings:

FIG. 2 is a top-level view of one embodiment of the room expansion system;

FIG. 3 is a rear plan view of one embodiment of the room expansion system;

FIG. 4 is a side view of one embodiment of the room expansion system;

FIG. 5 is a bottom view of the leader elongated member and an upper view of the base member;

DETAILED DESCRIPTION OF THE PREFERRED EMBODIMENTS

Figure 1:
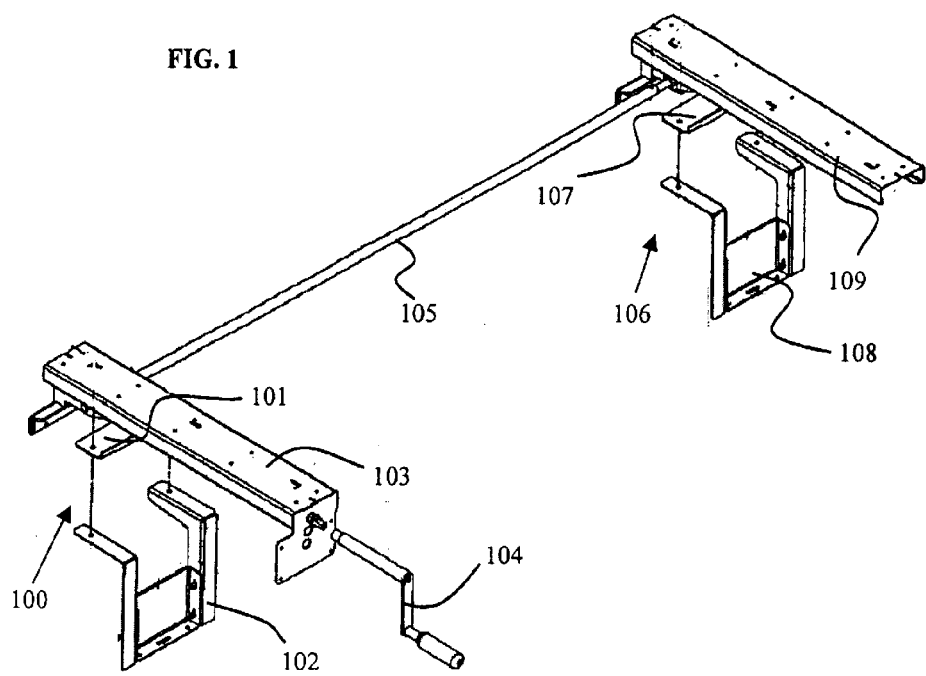
FIG. 1 is an upper view of one embodiment of the room expansion system.

The present invention is a system for expanding slide-out rooms integrated into vehicles. Referring to FIG. 1, a leading base member 100 has a leading mounting bracket 102 and a leading geared sliding bracket 101. As best seen in FIGS. 4 and 5, a leading base gear 400 is mounted to the leading geared sliding bracket 101 with its axis parallel to the extending room wall 200. The leading mounting bracket 102 is mounted to a protruding wheel well 201 in the bed of a vehicle. The leading geared sliding bracket 101 is mounted to the upper horizontal portion of the leading mounting bracket 102 and may additionally be affixed to the top surface of the wheel well 201.

FIGS. 1–5 illustrate a leading elongated member 103 having opposing sides with an inwardly angled lip. A leading gear rack 501 is mounted between the opposing sides of the leading elongated member 103 and is substantially parallel to both. A manual crank 104 connects to an acme screw 500, allowing a user to grip the manual crank 104 and rotate the acme screw 500. As seen in FIG. 5, the acme screw 500 extends from an opening in the leading elongated member 103, substantially parallel to the leading gear rack 501, to an acme nut 502. The acme nut 502 is mounted to the leading geared sliding bracket 101, in line with the acme screw 500. The acme screw 500 extends through the acme nut 502. As the acme screw 500 rotates, the threads on the acme screw 500 urges a force on the corresponding threads in the acme nut 502, thereby causing movement of the leading elongated member 103 relative to the leading base member 100, depending on the direction of rotation. The end of the leading elongated member 103 opposite the manual crank 104 is affixed to an external wall 200 of the movable portion of an extendible room as seen in FIGS. 2 and 4. The opposing sides and inwardly angled lip of the leading elongated member 103 allow it to slidingly engage with the leading geared sliding bracket 101, so the leading base gear 400 engages with the leading gear rack 501. The manual crank 104 is located in the interior of the slide-out room (not pictured), allowing operation from inside the room. The manual crank 104 may be located in a cabinet or behind a facade for aesthetic purposes.

As seen in FIGS. 1–4, a cross shaft 105 is coupled to the leading base gear 400 and to a following base gear 600. This allows the following base gear 600 to rotate in unison with the leading base gear 400.

Figure 6:
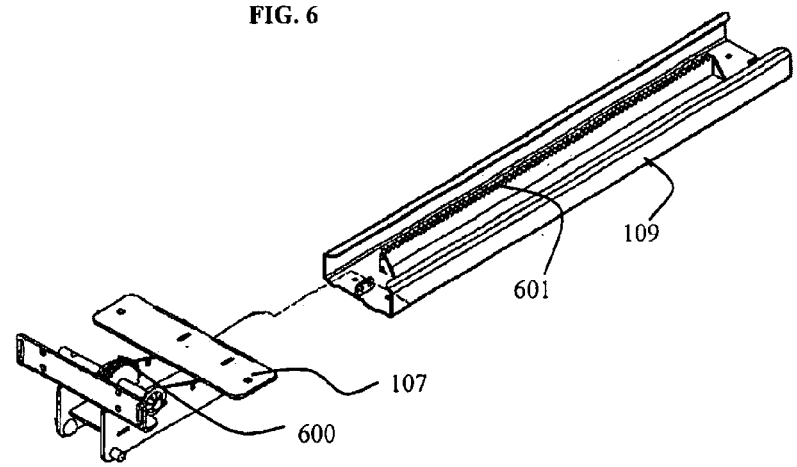
FIG. 6 is a bottom view of the following elongated member and an upper view of the base member.

As seen in FIGS. 1–4 and 6, a following base member 106 has a following mounting bracket 108 and a following geared sliding bracket 107. As best seen in FIGS. 4 and 6, a following base gear 600 is mounted to the following geared sliding bracket 107 with its axis parallel to the extending room wall 200. The following mounting bracket 108 is mounted to a protruding wheel well 201 in the bed of a truck. The following geared sliding bracket 107 is mounted to the upper horizontal portion of the following mounting bracket 108 and may additionally be affixed to the top surface of the wheel well 201.

FIGS. 1–4 and 6 illustrate a following elongated member 109 having opposing sides with an inwardly angled lip. A following gear rack 601 is mounted between the opposing sides of the following elongated member 109 and is substantially parallel to both. An end of the following elongated member 109 is affixed to an external wall 200 of the movable portion of an extendible room as seen in FIGS. 2 and 4. The opposing sides and inwardly angled lip of the following elongated member 109 allow it to slidingly engage with the following geared sliding bracket 107, so the following base gear 600 engages with the following gear rack 601.

In operation, the manual crank 104 is turned by hand from the interior of the slide-out room, rotating the acme screw 500. As the acme screw 500 rotates, it exerts a force on the threads of the acme nut 502, thereby moving the leading elongated member 103 relative to the leading base member 100. As the leading elongated member 103 moves, the leading gear rack 501 rotates the leading base gear 400. In turn, the leading base gear 400 rotates the coupled cross shaft 105 which further rotates the following base gear 600. The rotation of the following base gear 600 moves the following gear rack 601 and thus the following elongated member 109. The movement of the leading elongated member 103 and following elongated member 109 push or pull the external wall 200, extending or retracting the expandable room.

Figure 7:
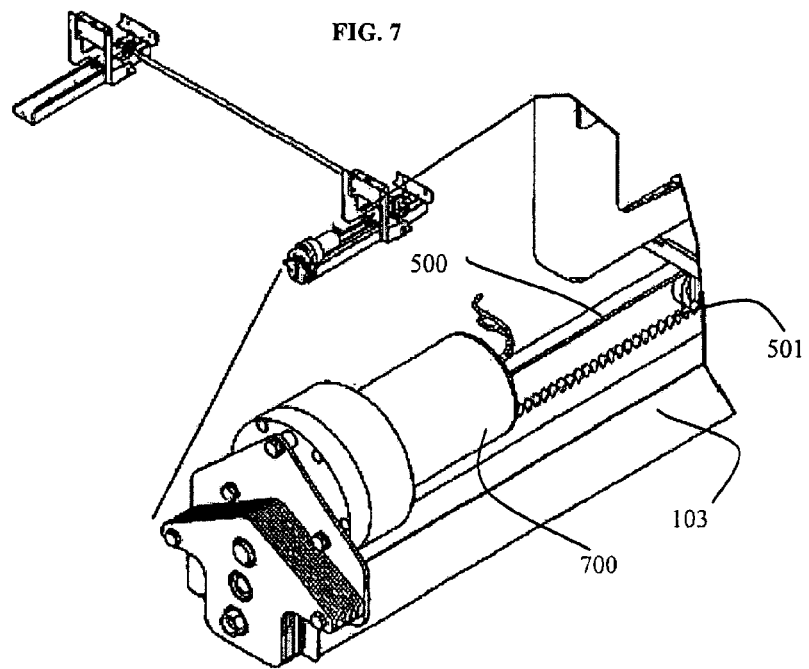
FIG. 7 is an enlarged view of the leading elongated member with an electric motor.

Referring to FIG. 7, an alternative embodiment replaces the manual crank 104 with an electric motor 700. The electric motor 700 is mounted between the opposing sides of the leading elongated member 109. This positioning allows for minimal or no reduction in the interior space of the slide-out room. The operative end of electric motor 700 is coupled to the acme screw 500, providing an alternative motive force for extending the movable portion of the room. Alternatives to the electric motor 700 include hydraulic or pneumatic devices.

It is understood that the preceding description is given merely by way of illustration and not in limitation of the invention and that various modifications may be made thereto without departing from the spirit of the invention as claimed.

What is claimed is:

1. An apparatus for selectively extending and retracting a slide-out portion of a vehicle, comprising:

a first elongated member movable relative to the vehicle;

a first base member fixed relative to the vehicle; and a drive system disposed on the elongated member, the drive system sized to move the elongated member relative to the base member, the drive system located in a space internal to said vehicle.

wherein the drive system comprises an electric motor and wherein said electric motor is disposed within the length of said elongated member.

2. The apparatus of claim 1 wherein the elongated member comprises a top surface, two opposing sides joined to the top surface, and an inwardly projecting lip extending from a bottom edge of the opposing sides.

3. The apparatus of claim 1 wherein the elongated member is slideably engaged with the base member.

4. The apparatus of claim 1 further comprising a base gear assembly which comprises a rotatable shaft spanning between a first side of the base member and a second side of the base member, and a gear unitary with the rotatable shaft.

5. The apparatus of claim 1 wherein the base member further comprises a mounting bracket angled to mount onto a wheel well of a vehicle.

6. The apparatus of claim 1 wherein the elongated member further comprises an acme screw engaged with an acme nut, the acme nut mounted to the base member.

7. The apparatus of claim 1 wherein the drive system operates to extend and retract the slide member and is selected from the group consisting of an electric motor, an integral motor brake, a hydraulic motor, and a pneumatic mechanism.

8. The apparatus of claim 1 wherein the elongated member further comprises an acme screw coupled to the drive system and engaged with an acme nut, the acme nut mounted to the base member.

9. An apparatus for selectively extending and retracting a slide-out portion of a vehicle, comprising:
- a first elongated member having a top surface, two opposing sides joined to the top surface, and an inwardly projecting lip extending from a bottom edge of the opposing sides, the elongated member also having a gear rack on a bottom surface of the elongated member and an acme screw mounted parallel to the gear rack;
- a first base member fixed to the vehicle having a first bracket coupled to a distal end of the base member and a second bracket coupled to a proximal end of the base member, the base member also having an acme nut engaged with the acme screw, and also having a base gear assembly engageable with the gear rack, the base gear assembly having a rotatable shaft spanning between a first side of the base member and a second side of the base member, and a gear unitary with the rotatable shaft; and
- a drive system for extending and retracting the elongated member coupled to the elongated member, the drive system located in a space internal to the vehicle.

10. The apparatus of claim 9, wherein the drive system comprises an electric motor and wherein said electric motor is disposed within the length of said elongated member.

11. The apparatus of claim 9 further comprising:
- a second elongated member;
- a second base member;
- said gear rack defining a first gear rack coupled to a bottom of said first elongated member;
- a second gear rack coupled to a bottom of said second elongated member;
- said base gear rack assembly defining a first base gear assembly disposed on said first base member and engagable with said first gear rack; and
- a second base gear assembly disposed on said second base member and engagable with said second gear rack;
- wherein said first base gear assembly and said second base gear assembly are coupled by a cross-shaft.

12. The apparatus of claim 9 wherein said base member includes a mounting bracket configured to mount to said vehicle.

13. The apparatus of claim 11 wherein said base member includes a mounting bracket having a first area for mounting to a horizontal surface of said vehicle and a second area for mounting to a vertical surface of said vehicle.

14. The apparatus of claim 1 wherein said base member includes a horizontal bracket positioned to extend beyond a first side and a second side of said elongated member.

15. The apparatus of claim 14 further comprising a mounting bracket having a first area for mounting to a horizontal surface of said vehicle and a second area for mounting to a vertical surface of said vehicle, wherein said mounting bracket couples to said horizontal bracket.

16. The apparatus of claim 15 wherein said mounting bracket is sized and shaped to engage a horizontal surface and a vertical surface of a wheel well of said vehicle.

17. The apparatus of claim 1 further comprising:
- a second elongated member;
- a second base member;
- a first gear rack coupled to a bottom of said first elongated member;
- a second gear rack coupled to a bottom of said second elongated member;
- a first base gear assembly disposed on said first base member and engagable with said first gear rack; and
- a second base gear assembly disposed on said second base member and engagable with said second gear rack;
- wherein said first base gear assembly and said second base gear assembly are coupled by a cross-shaft.

18. The apparatus of claim 1 wherein said base member includes a mounting bracket configured to mount to said vehicle.

19. The apparatus of claim 1 wherein said base member includes a mounting bracket having a first area for mounting to a horizontal surface of said vehicle and a second area for mounting to a vertical surface of said vehicle.

20. The apparatus of claim 1 wherein said base member includes a horizontal bracket positioned to extend beyond a first side and a second side of said elongated member.

21. The apparatus of claim 20 further comprising a mounting bracket having a first area for mounting to a horizontal surface of said vehicle and a second area for mounting to a vertical surface of said vehicle, wherein said mounting bracket couples to said horizontal bracket.

22. The apparatus of claim 21 wherein said mounting bracket is sized and shaped to engage a horizontal surface and a vertical surface of a wheel well of said vehicle.

* * * * *